US012138636B2

(12) United States Patent
Aanesbug et al.

(10) Patent No.: US 12,138,636 B2
(45) Date of Patent: Nov. 12, 2024

(54) DEVICE FOR AUTOMATIC CAPTURING AND REMOVING MAGNETIC MATERIAL FROM A FLOW OF MATERIAL

(71) Applicant: JAGTECH AS, Orkanger (NO)

(72) Inventors: Geir Olav Aanesbug, Meldal (NO); Jan Egil Pallin, Heimdal (NO)

(73) Assignee: JAGTECH AS, Orkanger (NO)

( * ) Notice: Subject to any disclaimer, the term of this patent is extended or adjusted under 35 U.S.C. 154(b) by 0 days.

(21) Appl. No.: 18/260,139

(22) PCT Filed: Jan. 24, 2022

(86) PCT No.: PCT/NO2022/050020

§ 371 (c)(1),
(2) Date: Jun. 30, 2023

(87) PCT Pub. No.: WO2022/158985

PCT Pub. Date: Jul. 28, 2022

(65) Prior Publication Data

US 2024/0058825 A1 Feb. 22, 2024

(30) Foreign Application Priority Data

Jan. 25, 2021 (NO) .................................... 20210097

(51) Int. Cl.
*B03C 1/28* (2006.01)
*B03C 1/032* (2006.01)
*B03C 1/033* (2006.01)

(52) U.S. Cl.
CPC .............. *B03C 1/284* (2013.01); *B03C 1/032* (2013.01); *B03C 1/0332* (2013.01); *B03C 2201/18* (2013.01); *B03C 2201/22* (2013.01); *B03C 2201/28* (2013.01)

(58) Field of Classification Search
CPC ....... B03C 1/284; B03C 1/0332; B03C 1/032; B03C 2201/18; B03C 2201/22; B03C 2201/28
See application file for complete search history.

(56) References Cited

U.S. PATENT DOCUMENTS 5,043,063 A 8/1991 Latimer
5,188,239 A * 2/1993 Stowe ..................... B03C 1/284 209/229
5,819,949 A 10/1998 Schaaf et al.
6,077,333 A * 6/2000 Wolfs ...................... B03C 1/288 210/695
6,250,475 B1 * 6/2001 Kwasniewicz ......... B03C 1/284 209/229

(Continued)

OTHER PUBLICATIONS

International Search Report and Written Opinion mailed Mar. 21, 2022 for International Patent Application No. PCT/NO2022/050020.

*Primary Examiner* — Joseph C Rodriguez
(74) *Attorney, Agent, or Firm* — Alix, Yale & Ristas, LLP

(57) ABSTRACT

Device for automatic capturing and removing magnetic material from a flow of material, wherein the device includes a plurality of retractable magnet rod assemblies for capturing magnetic material in a flow of material passing the retractable magnet rod assemblies, where each retractable magnet rod assembly includes a magnet rod comprising at least two magnet segments encapsulated in a non-magnetic material.

11 Claims, 10 Drawing Sheets

(56) References Cited

U.S. PATENT DOCUMENTS

| | | | | |
|---|---|---|---|---|
| 6,355,176 | B1 * | 3/2002 | Schaaf | B01D 33/04 210/695 |
| 8,132,674 | B1 | 3/2012 | Allore et al. | |
| 8,360,247 | B2 | 1/2013 | Baker | |
| 8,474,629 | B1 * | 7/2013 | Allore | B03C 1/284 209/229 |
| 8,641,899 | B2 | 2/2014 | Branch | |
| 9,352,331 | B1 * | 5/2016 | Lee | B03C 1/032 |
| 10,807,101 | B2 | 10/2020 | Pallin et al. | |
| 2003/0173264 | A1 | 9/2003 | Yang | |
| 2018/0078947 | A1 * | 3/2018 | Pallin | B03C 1/0335 |
| 2022/0250086 | A1 | 8/2022 | Anesbug et al. | |

* cited by examiner

DEVICE FOR AUTOMATIC CAPTURING AND REMOVING MAGNETIC MATERIAL FROM A FLOW OF MATERIAL

BACKGROUND

The disclosed embodiments relate to a device for automatic capturing and removing magnetic material in a flow of material, and especially to a device providing continuous capturing of unwanted magnetic material in a flow of material, while removing magnetic material.

Prior art solutions related to magnetized bars that are used to remove magnetic/metal material, such as metal cuttings, metal shavings, metal parts, and the like, in a flow of material, such as in a fluid stream of oil well drilling mud or flow of raw material are known. Methods and apparatuses for removing metal cuttings, metal shavings, metal parts captured by the magnetized bars by the use of a non-magnetic wiper assembly arranged slidable upon the magnetized bar between the ends thereof for removal of the captured magnetic metal from the magnetized bar are further known. Many of the magnetic metal parts that are collected by the magnetized bars, also known as ditch magnets, are pieces that have been cut or shaved and are thus of irregular shape and can have sharp edges/points, or the like. Metal cuttings and fines increase the wear and tear on equipment downstream the system. Safety is very important and meaningful in such operations including personnel handling equipment like this, especially in the oil and gas industry. Cuttings that are collected by a ditch magnet can include sharp edged debris that could possibly cut the hand of a worker who handles the ditch magnet. Fluids and debris from the cleaning of the magnets might also create hazards as slippery spills on deck and pollution to the environment. Gaseous fumes from the removed waste are also an issue that must be considered. Reducing maintenance costs and increased lifetime of downstream equipment is also preferred. Magnetic fines and particles in the drilling fluid also interrupt the logging in directional drilling by shielding of the navigation compass at the drilling bit during directional drilling, especially close to the earth magnetic north- and south pole.

Cuttings that have been retrieved from a ditch magnet can provide information that is beneficial to oil and gas well operators. These collected cuttings may indicate casing wear during ordinary drilling operations, pipe wear, or any other factor which could be used for economic or maintenance considerations.

In other industrial plants the supply of raw material includes unwanted microscopic foreign metal material or foreign metal bodies, in the form of metal fragments, screws, washers, or the like. Such unwanted metallic foreign contaminants are referred to as "tramp metals" in the industry. The presence of these metallic contaminants in the raw materials being processed in product-forming machines are undesirable for a variety of reasons. Contaminants may cause damage on industrial machine or render the finished part unusable or the presence of metal in the product may cause unacceptable structural, visual, or magnetic aberrations in the finished part.

Further, in the food industry, fish food industry or animal food industry also such equipment is favourable to use to detect unwanted metal material in the products.

Accordingly, the need for a device for removing unwanted magnetic metal material from a flow of material in many different areas, such as in oil well drilling mud, product-forming machines, granular handling equipment, and other plants (such as food) or processes where there is needed to remove magnetic metal material from a flow of material.

Different solutions have been proposed for providing methods and apparatus which are arranged for capturing unwanted magnetic metal material in a flow of material, and which at the same time should be automatically cleaned and simple to operate, which solutions will be discussed below.

U.S. Pat. No. 5,043,063 (Michael W. Latimer) discloses a magnetic trap made up of a hollow, generally cylindrical body, having an open top, an inlet and an outlet for connecting to a flow line for liquid containing entrained removable magnetic material. There is a removable cover for the hollow body, a plate is supported on the cover, and elongated, spaced non-magnetic tubes are fixed to the cover. Elongated stacks of permanent magnets are attached to the plate and extend through the cover into the tubes. When magnetic material held to the tubes by the magnets is to be removed, the cover can be removed from the body, the magnetic stacks can be pulled out of the non-magnetic tubes with the plate, thereby removing the magnetic fields from the tubes so that the magnetic material held to the tubes falls off of the tubes, thereby cleaning the tubes.

From U.S. Pat. No. 5,188,239 (Michael W. Stowe) it is disclosed a tramp metal separation device adapted to be removably inserted into a housing which directs pelletized raw material to an industrial machine and to separate tramp metal contaminants therefrom. A drawer frame having an outer face plate with a plurality of openings disposed therethrough is adapted to be removably inserted into the housing. A plurality of cylindrical magnets, adapted to be inserted through the plurality of openings in the outer face plate, is secured to a drawer plate. Described is also a plurality of silicon-based O-rings that may be disposed in grooves on the inner surface of the openings so as to form a wiper mechanism to aid in removing particles from the magnets.

U.S. Pat. No. 8,641,899 (James A. Branch) describes a method and apparatus for removing metal cuttings from an oil well drilling mud stream which provides a magnetic body or "ditch magnet" having end plates that extend radially and circumferentially from the magnetic body, the plates being positioned at end portions of the magnetic body. A third plate in the form of a wiper is used to dislodge metal cuttings and other metallic material from the magnetic body after the magnetic body has accumulated such metallic parts. One of the end plates can be removable to facilitate a complete scraping or wiping of the metallic parts from the metallic body by the wiper plate.

The above-mentioned solutions suffer from that they will not provide a continues capturing of unwanted metal material, as the flow of material will need to be stopped at the time of cleaning of magnetic material in the magnets or the flow of material will be left without magnets at the time of cleaning. In e.g. a drilling operation there will be sufficient costs with stopping the drilling while the magnets are cleaned for metal material. Continuing the flow of material while the magnets are cleaned is usually not an option as this will result in that equipment could be damaged due there is no capturing of magnetic material.

Solutions arranged for continuous capturing also exist, which will be discussed below.

WO 2009124342 describes magnetic separation apparatus for separating magnetic materials from non-magnetic materials in a material flow comprising self-cleaning magnetic separators comprising: a cylinder having a first end closer to a material flow than its second end in use, a piston slidingly mounted within the cylinder, and a magnetic shaft extending from the piston, the piston and cylinder adapted to move the magnetic shaft between an extended position and a retracted position, such that in the extended position, at least a sleeveless portion of an outer surface of the magnetic shaft is exposed to the material flow and in the retracted position the magnetic portion is retracted substantially or wholly within the cylinder, the apparatus including a protected shaft wiper and shaft seal; within the first end of the cylinder for removing extracted magnetics. Accordingly, it is described an automatic solution where a piston and cylinder are used for retracting the magnetic shaft, which will be both complex and expensive to install and maintain. Further, it will not be suitable for use in capturing and removing metal cuttings from an oil well drilling mud stream onshore or offshore due to the harsh environment. This solution will also have a problem getting rid of the collected material. Further, the magnetic shafts are arranged in parallel in width direction and in the longitudinal direction, which will not be the most effective manner for capturing metal cuttings. Further, the axial movement is hydraulic operated, and can expose an environmental hazard in hazard environment. Furthermore, the collected material will have a potential to drop down in the fluid while cleaning due to the vertical arrangement of the assembly.

U.S. Pat. No. 8,132,674 B1 describes a device for magnetic separation of tramp metal, which consists of a first and a second housing. The first housing has an inlet and an outlet, a first drawer and a second drawer. Each of the drawers has a plurality of magnets and a wiper assembly for each of the magnets. The drawers are supported with respect to the first housing such that each of the drawer is moveable between an extended position and a retracted position. In the extended position, the magnets of the respective drawer are positioned within the first housing and are adapted to be in contact with the stream of raw materials. In the retracted position, the magnets of the respective drawer are positioned outside of the first housing. The drawers move independently of each other and the device is so constructed that one set of magnets is always 5 in contact with the fluid, which requires cleaning. This solution also suffers from the disadvantages as mentioned above for WO 2009124342, but in addition this solution is arranged for arranging the magnets in the horizontal plane, which would be a severe problem if used in oil well drilling mud stream onshore or offshore and would require complex sealing means to avoid mud from leaving when a magnet is drawn out for cleaning.

WO 2009124342 A1 describes a device for capturing and removing magnetic material from a flow of material, wherein the device includes magnet assemblies including magnet rods for capturing magnetic material in a flow of material passing the magnet assemblies and where the magnet assemblies are removably arranged to a frame assembly of the device, wherein each magnet assembly includes at least two magnet rods and that the device includes at least two rows of magnet assemblies for enabling continuous capturing of magnetic material. This solution has the disadvantage in weight for manual handling due to the combination of two magnet rods mounted together. The solution also has the disadvantage that it needs a customized assembly frame for each installation and is not flexible regarding the geometry of the installation area neither in height nor width of the cross section.

A further disadvantage with the two latter solutions is that they would need to be sufficiently displaced from each other to ensure that the magnetic force of each magnet does not affect an adjacent magnet, as this will result in problems with withdrawing the magnets in an automated manner.

Another disadvantage with the latter solutions is that the use of automatic control will considerably increase the space needed for installation and use of the solutions.

A further solution that solves many of the drawbacks of the mentioned prior art solutions, is WO2016159779 A1, with the same inventors as the present application. WO2016159779 A1 discloses a device for capturing and removing magnetic material from a flow of material, wherein the device includes magnet assemblies including magnet rods for capturing magnetic material in a flow of material passing the magnet assemblies and where the magnet assemblies are removably arranged to a frame assembly of the device, wherein each magnet assembly includes a set of at least two magnet rods.

A drawback of all prior art solutions is that the magnet rods are not individually adjustable in relation to the material of flow. None of the prior art solutions have the possibility to adapt to different flow chute bottom profiles without rebuilding. Another drawback of all prior art solutions is that the magnet rods is not tiltable to a horizontal position for draining non contaminated fluids from the attached collected material before cleaning the magnetic rods. None of the prior art solutions describes an integrated system for collecting and transportation of the collected material to a common collector for further processing opportunities. The prior art solutions are not block scalable for different widths of installations and therefore not easy customized for various installations.

SUMMARY

Provided herein is a device for automatic capturing and removing of magnetic material in a flow of material which solves the above-mentioned drawbacks of prior art.

The inventive embodiments provide automatic cleaning of the magnetic rods used for capturing and removing of magnetic material in a flow of material.

The disclosed embodiments also enable use of axial retractable magnetic rod assemblies operated by any form of linear actuator (electric, pneumatic, hydraulic etc.)

Also provided is a device for capturing and removing magnetic material in a flow of material, which provides continuous collection of magnetic materials while removing and cleaning.

Also provided is a device for automatic capturing and removing magnetic material in a flow of material where a plurality of retractable magnet rod assemblies are arranged in a pattern to provide a magnet grid providing the best possible magnetic field over the area which the material is flowing through the device.

The disclosed embodiments can be used to establish an automatic cleaning pattern/cycle of the retractable magnetic rod assemblies preventing that too many magnet rods are extracted from the flow of material at time.

Also provided is a device for automatic capturing and removing magnetic material in a flow of material where the plurality of retractable magnet rod assemblies is arranged within a fixed frame.

Also provided is a device for automatic capturing and removing magnetic material in a flow of material to obtain an easy, cost efficient and interchangeable installation of the assembly regardless the geometry of the installation site/launder.

Also provided is a device for automatic capturing and removing magnetic material in a flow of material, which is scalable both in length and number of retractable magnet rod assemblies.

Also provided is a device for automatic capturing and removing magnetic material in a flow of material, which has low weight, small dimensions and easy installed.

Also provided is a device for automatic capturing and removing magnetic material in a flow of material, which satisfies the requirements of explosion hazard environment.

Also provided is a device for automatic capturing and removing magnetic material in a flow of material, which can easily be adapted to new and existing system.

Also provided is a device for automatic capturing and removing magnetic material in a flow of material with an integrated cleaning system based on standard machine elements to reduce maintenance cost.

Also provided is a device for automatic capturing and removing magnetic material in a flow of material with the highest surface magnetic flux density on the magnet rod surface.

Also provided is a device for automatic capturing and removing magnetic material in a flow of material with fast and easy detachment of magnet rod retraction and cleaning assemblies.

Also provided is a device for automatic capturing and removing magnetic material in a flow of material with magnetic rod assemblies that are tiltable around a common rotation axis to drain the magnet rods from liquids before cleaning the magnet rods.

Also provided is a device for automatic capturing and removing magnetic material in a flow of material with retractable magnetic rod assemblies with standard length with no need for customisation of additional deliveries, reducing order and delivery time for spare retractable magnetic rod assemblies.

A device for automatic capturing and removing magnetic material from a flow of material includes a plurality of separate retractable magnet rod assemblies arranged together in a predefined assembly pattern creating a magnetic pattern.

Flow of material does herein mean a material in a condition to be able to flow through the disclosed device, such as fluids, raw material and so on.

The retractable magnet rod assemblies comprise a magnet rod enclosed in a non-magnetic material, such as a sleeve or an encapsulating non-magnetic material, as well known for a skilled person.

The retractable magnet rod assembly is further provided with non-magnetic end areas of the magnet rods. The magnet rods can include permanent magnets, electromagnets or controllable magnets, depending on the area of use. In e.g. explosion hazard areas where there are possibilities for gas being present, such as on offshore installations, permanent magnet rods will be used to avoid possibilities for sparks which could set gas on fire.

The disclosed device comprises multiple retractable magnet rod assemblies arranged in a defined pattern with a common pivoting axis for pivoting each retractable magnet rod assembly out of the fluid from a vertical to a horizontal position for non-contaminated fluid drainage.

The retractable magnet rod assemblies are arranged in a matter creating an optimal pattern for increased magnetic flux density between the magnet rods in vertical position submerged in the fluid.

The pivoting movement of the retractable magnet rod assemblies around the common pivoting axis is actuated by a linear or rotating actuator (electrical, pneumatic, hydraulic etc.).

The retractable magnet rod assemblies are further provided with a linear actuator (electric, pneumatic, hydraulic etc.) for retracting the magnet rods through at least one magnet rod wiper for cleaning the magnet rod surface during retracting movement of the magnet rod.

Furthermore, the retractable magnet rod assemblies comprise a retractable flow divider for creating vortex flow around the magnet rods submerged in the fluids optimizing the flow around the magnet rods.

In another embodiment, the pivoting axis structure arrangement of the retractable magnet assemblies is a collector for removed magnetic material by the means of being hollow and provided with openings for each retractable magnet rod assembly for collecting removed magnetic material.

The pivoting axis structure arrangement is further provided with device for extracting removed magnetic material away from the device by a rotating screw arrangement or conveyor arrangement to a common collector for further processing of the removed magnetic material.

The device is automated and either with analogic logical components or PLC programmed actuators programmed for a defined and time adjustable cleaning cycle for each retractable magnet rod assembly. The automated cleaning cycle is programmed in a way that at least one of the retractable magnet rod assembles is cleaned at time.

Depending of the application, process operation and the flow velocity of the material, the cleaning cycle time can be reduced or increased to ensure optimal retraction of magnetic material from the flow.

The defined cleaning cycle describes as pivoting/tilting the extracted retractable magnet rod assembly from a position perpendicular to the flow direction submerged in the flow to a horizontal extracted position above the flow for drainage of non-contaminated fluids from the extracted magnetic rod. Further, the retractable magnet rod assembly actuator will retract the magnetic rod through the at least one wiper, removing magnetic material from the magnetic rod. Fully retracted, the actuator will extract the magnetic rod back to outer predefined position. The extracted retractable magnet rod assembly will pivot/rotate from its horizontal position during the cleaning process, back to vertical position perpendicular to the flow, submerged in the flow.

The device further comprises enclosures for QHSE.

One can also be arranged with means in front of the device for measuring the retracted material amount, which could be used to detect the cycle time for when the retractable magnet rod assemblies should be cleaned.

The magnet assemblies can include permanent magnet rods, electromagnet or controllable magnet rods which can be switched on and off, or even controllable magnet rods where one can control the properties/effect thereof by means of a control device arranged for this.

The magnet rod of the retractable magnet rod assembly, due to being capable of moving in longitudinal direction of the retractable magnet rod assembly, enables the movement of the magnet rod in vertical plane for horizontal adjustment for distributing magnetic field over the whole height of the cross-sectional area, which defines the area where the material flows through the device.

According to one embodiment, the magnet rod assemblies are arranged to an installation frame assembly that together form a module for the device. The device can thus easily be adapted to include several modules like this, and where the device may comprise two or more modules like this arranged in series.

The small diameter of the magnet rod assemblies, together with the calculated pattern of magnet rods decreases the speed of flow through the magnetic grid, without significantly increasing the pressure drop through the device.

The installation frame assembly is adapted for arrangement of a plurality of retractable magnet rod assemblies, arranged in rows, positioned in series in the flow direction to provide at least two separate rows of retractable magnet rod assemblies, seen in the material flow direction. By this is achieved that one can clean one or more retractable magnet assemblies of the first row or second row etc. while the other row of retractable magnet assemblies continuously performs capturing of magnetic material. By this is achieved that there will be no need for stopping the material flow or leaving the material flow unprotected when cleaning. The disclosed embodiments further achieve a device where the retractable magnet rod assemblies are not required to remove from the device for cleaning as for many of the prior art solutions.

When there is a need for cleaning, the separate retractable magnet rod assembly can easily be activated in an automated manner while remaining rows of retractable magnet rod assemblies continue the capturing of magnetic material.

Depending of the application the flow velocity of the material can be reduced or increased in front of the device.

One can also arrange means in front of the device for measuring the material level, which could be used to detect when the retractable magnet assemblies should be cleaned.

When the material level has increased above a certain level, this will indicate that the material flow through the device is low and that the magnet assemblies should be cleaned.

Further preferable features and details of the disclosed embodiments will appear from the following example description.

BRIEF DESCRIPTION OF THE DRAWINGS

The present invention will below be described in further detail with reference to the attached drawings, where.

DETAILED DESCRIPTION

Figure 1:
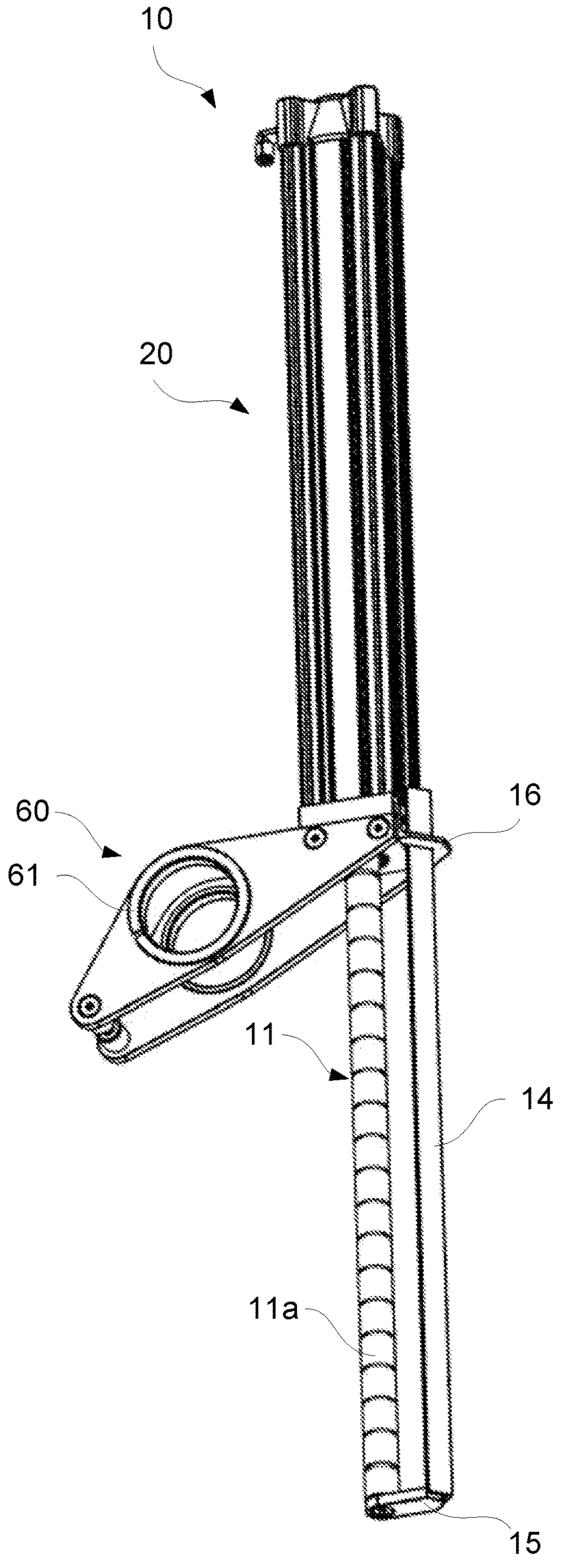
FIG. 1 is a principle drawings of a retractable magnet rod assembly according to the disclosure.
Figure 2:
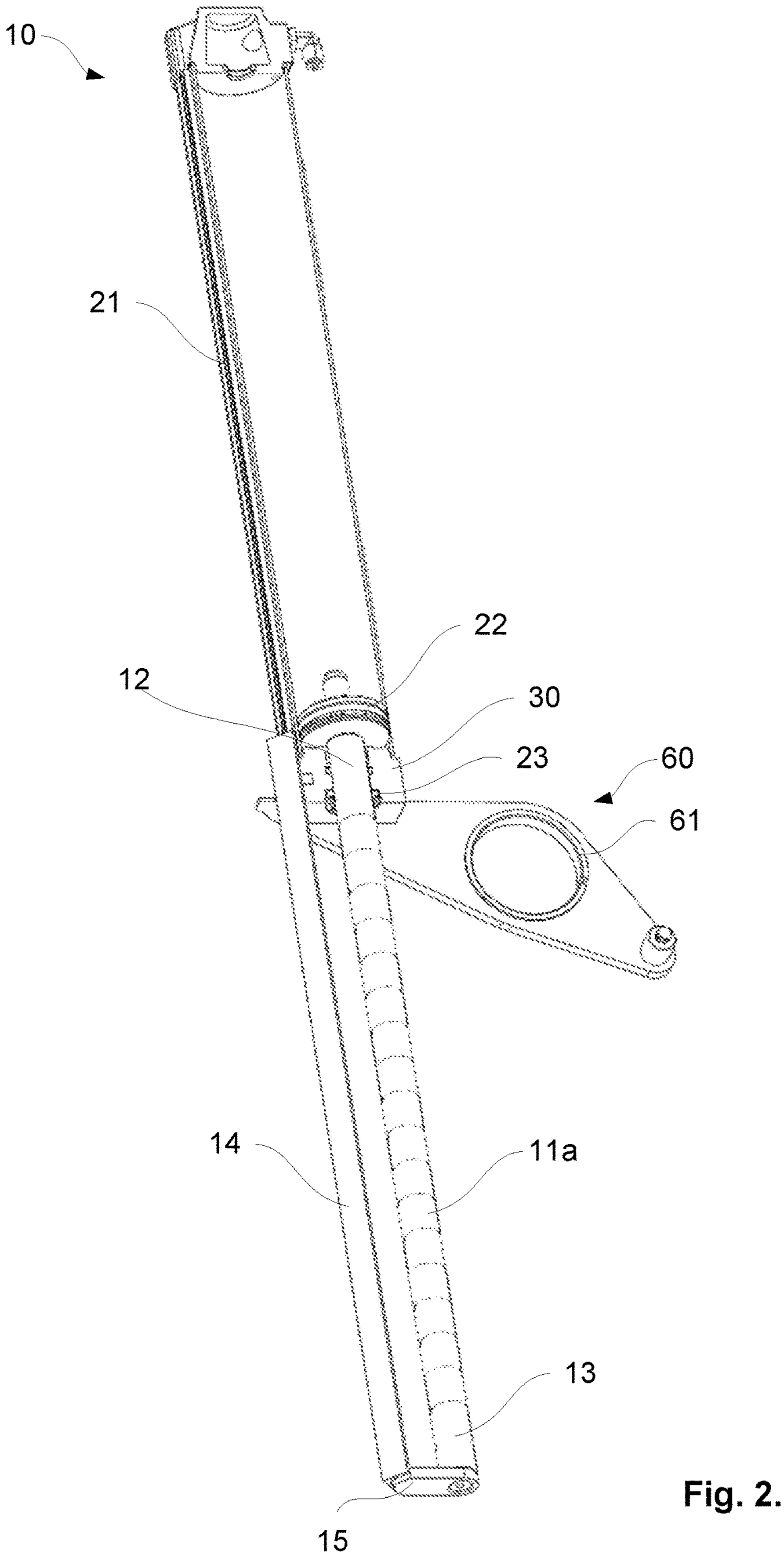
FIG. 2 is a cross-sectional view of the retractable magnet rod assembly in FIG. 1.

Reference is now made to FIGS. 1 and 2 showing principle drawings of a retractable magnet rod assembly 10 for a device 100 according to the disclosure, where FIG. 2 is a cross-sectional view showing further details. The retractable magnet rod assembly 10 comprises a magnet rod 11 according to the exemplary embodiment and includes at least two magnet segments 11*a* (shown in further details in FIGS. 5A and 5B) in the form of permanent magnets, enclosed in a non-magnetic sleeve or material, and where upper 12 and lower 13 ends thereof do not contain magnets. Even if permanent magnet rods 11 hereafter will be used as the example, this does not limit the scope of the invention as also other magnet segments or magnetic field generators can be used, such as controllable magnet rods or electromagnetic rods.

The retractable permanent magnet rod assembly 10 further comprises a linear actuator assembly 20 comprising a housing 21 having a first end and a second end. The linear actuator assembly 20 further comprises an actuator mechanism 22, such as a piston, lead screw or similar, arranged movable in longitudinal direction of the housing 21, which is arranged to the upper end of the magnet rod 11. The actuator mechanism 22 is adapted to move the magnetic rod 11 between an extended position wherein the magnet rod 11 is positioned outside the housing 21 and in contact with a marital flow and a retracted position wherein the magnet rod 11 is retracted into the housing 21.

The linear actuator assembly 20 thus works similar to a conventional linear actuator, wherein the movement of the magnet rod 11 from the retracted to the extended position being an extension stroke, and the movement of the magnet rod 11 from the extended to the retracted position being a retraction stroke. The extended position is herein a position where the section with magnets 11*a* of the magnet rod 11 is exposed to the material flow and the retracted position is a position where the magnet rod is retracted in the housing 21.

The housing 21 at the first end, i.e. where the magnet rod 11 protrudes from the housing 21, is provided with at least one metal wiper 23 of non-magnetic material, see FIG. 2, arranged to the housing 21 by means of a front piece 30.

The at least one metal wiper 23 of non-magnetic material has a central opening adapted to outer surface of the permanent magnet rods 11 to clean material thereof by movement of the magnet rod 11.

In this manner, magnetic material collected by the magnet rod 11 will be removed from the magnet rod 11 when the magnet rod 11 is retracted into the housing 21 of the linear actuator assembly 20.

According to a further embodiment, the retractable magnet rod assembly 10 is further provided with a retractable flow divider 14 extending in longitudinal direction of the retractable magnet rod assembly 10. The retractable flow divider 14 exhibits a longer length than the magnet rod 11 and is fixed to lower end of the magnet rod 11 by means of a mounting bracket 15 and slidingly arranged to housing 21 by means of a holder 16 arranged to the front piece 30. The retractable flow divider 14 is mainly U-shaped and arranged such that the opening thereof is facing along the flow of material, and in this way the flow divider 14 act as a protection for the magnet rod 11. The flow divider 14 is arranged at distance from the magnet rod 11. Due to the flow divider is fixed to lower end of the magnet rod 10 and slidingly arranged exterior of the housing 21, the flow divider 14 will slide along the exterior of the housing 21 when the magnet rod 10 is retracted into the housing 21.

Further, the flow divider 14 will result in turbulence behind them, seen in the material flow direction, which improves the effect of the magnet rods 11, resulting in higher efficiency and more captured unwanted metal material. The flow divider 14 will interrupt the laminate flow through the circular magnet grid by creating a vortex of flow near the magnets together with a sharp change of flow direction, using the pendulum gravity from this change of direction to throw heavier particles to the base of the magnetic field of each magnet rod 11. The flow divider 14 is accordingly arranged for decreasing speed of material flow through the device 100, and creating turbulence behind them, without significantly increasing pressure drop through the device 100.

Accordingly, the flow divider 14 also has an important function as flow breakers, which substantially increase the performance of the magnets.

Figure 3:
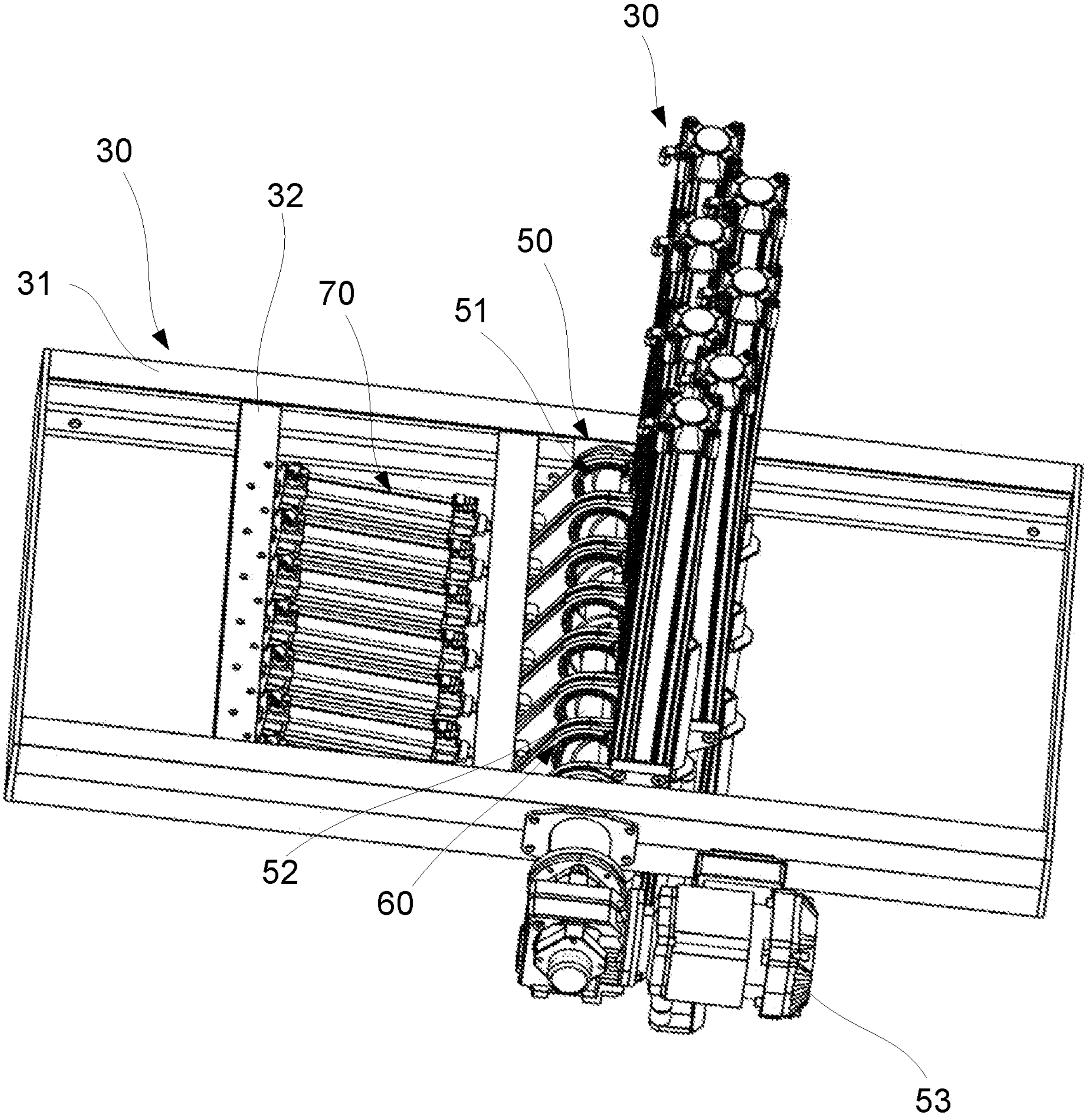
FIG. 3 is a principle drawing of an installation frame assembly for a plurality of the retractable magnet assemblies in FIG. 1.

Reference is now made to FIG. 3 which is a principle drawing of an installation frame assembly 30 for the retractable magnet rod assemblies 10 shown in FIGS. 1 and 2. The installation frame assembly 30 is formed by rectangular or quadratic installation frame 31 that is adapted for arrangement to a structure 40 (FIG. 4) in which material is flowing at an installation site. The installation frame assembly 30 further comprises a transversally extending pivoting axis arrangement 50 for the retractable magnet rod assemblies 10, arranged in the installation frame 31, enabling pivoting arrangement of the mentioned magnet rod assemblies 10 in the installation frame assembly 30. The transversally extending pivoting axis arrangement 50 is in the shown embodiment an elongated hollow structure that works both as a common pivoting axis for the magnet rod assemblies 10 and as a collector for removed material and transport path for collected magnetic material, as will be further described below.

The retractable magnet rod assemblies 10 are arranged pivotable about the mentioned common pivoting axis structure 50 by means of at least one mounting bracket 60 arranged at lower part of the housing 21 enabling pivoting movement of the retractable magnet rod assembly 10 about the transversal pivoting axis structure 50. In the shown embodiment, the retractable magnet rod assembly 10 is rotatably arranged to the pivoting axis structure structure 50 by means of a pair of mounting brackets 60, spaced apart, at lower part of the housing 21.

Figure 5A:
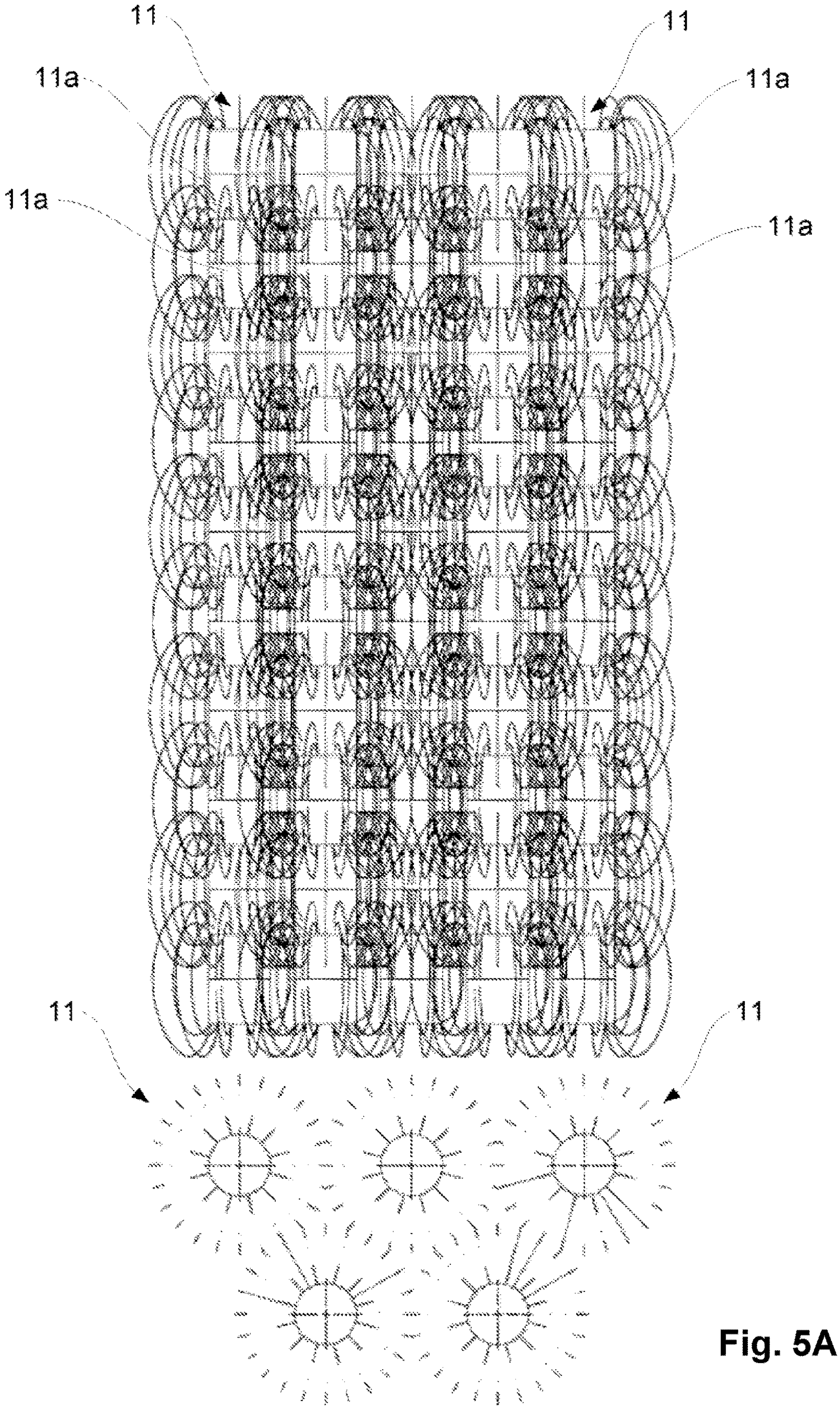
FIGS. 5A-5C are principle drawings of magnet rods containing magnet segments, as well as showing magnetic field created thereby.
Figure 5B:
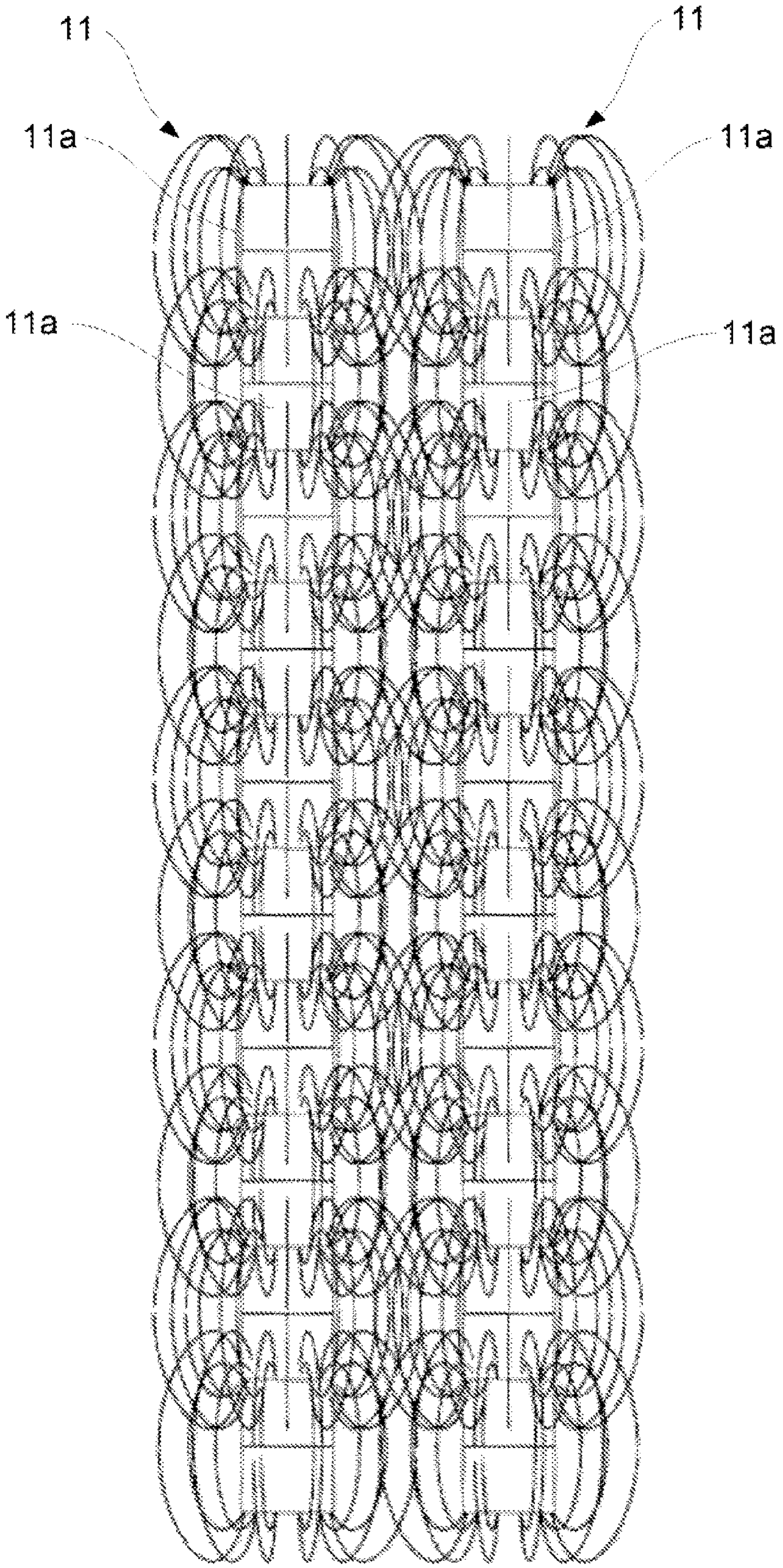
Figure 5C:
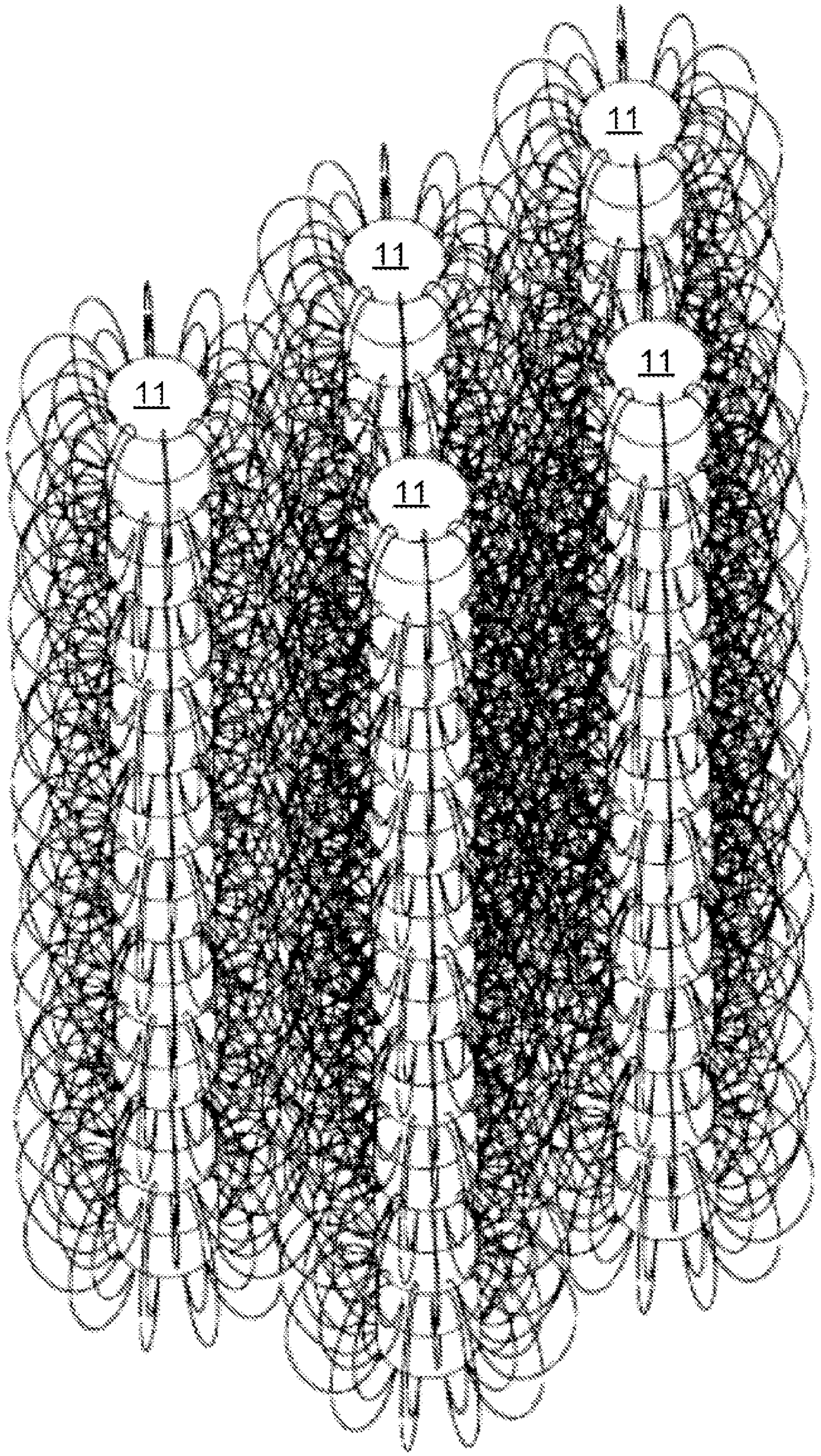

The at least one mounting bracket 60 is further adapted in shape and size to position the magnet rod 10 in a desired magnetic pattern, as shown in FIGS. 5A-5C.

The retractable magnet rod assemblies 10 are each arranged to a linear or rotating actuator 70 (electric, pneumatic, hydraulic, etc.) enabling pivoting movement of the retractable magnet rod assemblies 10 about the common pivoting axis structure 50. In the shown embodiment, the actuator 70 is a linear actuator (pneumatic, hydraulic or electric) hinged arranged to the installation frame 31 at one end via a support structure 72 and hinged arranged to the mounting bracket 60 of the retractable magnet rod assembly 10 at the other end. By extension and retraction of the linear actuator 70, a pivoting movement of the retractable magnet rod assembly 10 about the support structure 50 is achieved. In this manner, each magnet rod assembly 10 is associated with an independent actuator 70 enabling independent pivoting movement of the magnet rod assemblies 10 about a common pivoting axis is achieved. In such an embodiment, a sliding bearing 61 is preferably arranged between the pivoting axis structure 50 and mounting bracket 60 to reduce the friction.

Accordingly, the actuator 70 is arranged to move the retractable magnet rod assembly 10 between a mainly vertical position to a mainly horizontal position.

In an alternative embodiment the retractable magnet rod assembly 10 is arranged to the pivoting axis structure 50 by means of a rotational interface achieved by a slewing ring with at least one slewing gear drive driven by a motor providing a rotational movement of the retractable magnet rod assembly 10 about the pivoting axis structure 50. Other suitable solutions will be within the knowledge of a skilled person.

The pivoting axis structure 50 is hollow and further at upper side provided with openings 51 distributed in longitudinal direction thereof and adapted for collecting collected magnetic material from the retractable magnet rod assemblies 10. In the shown embodiment the mentioned openings 51 is adapted the space between the pairs of mounting brackets 60.

The hollow pivoting axis structure 50 is further provided with a device 52 for extracting removed magnetic material away from the device 100 and to an outlet at one end of the pivoting axis structure 50, which in the shown embodiment is a pipe. The device 52 is a rotating screw arrangement or conveyor arrangement adapted for extracting removed magnetic material in the longitudinal direction of the common axis structure 50 to an at one end thereof and to aa common collector (not shown) for further processing. In the shown embodiment, the device 52 is formed by a rotating screw driven by a motor 53.

Figure 4:
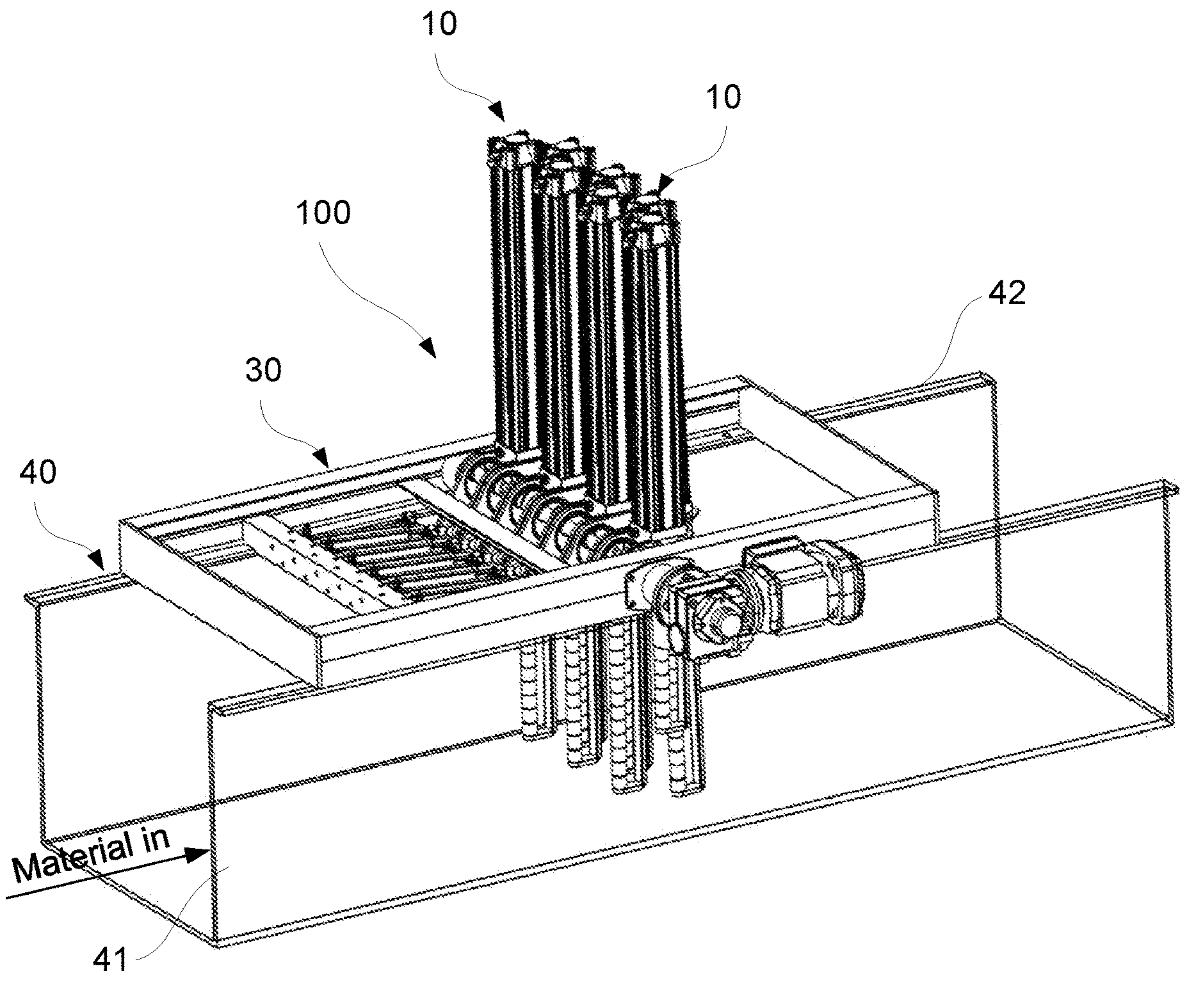
FIG. 4 is a principle drawing of a complete device according to the disclosure arranged to a structure wherein material flow.

The installation frame assembly 30 can be arranged to the structure 40 by means of fixation means (not shown). An example of such a structure is shown in FIG. 4, where the structure 40 is formed by a flow channel 41 provided with longitudinally extending flanges 42, to which longitudinally extending flanges 42 the installation frame assembly 30 is attached by means of the fixation means, such as e.g. bolts or similar, for fixation of the installation frame assembly 30 to the structure 40.

In FIGS. 5A-5C there are shown five neighbouring magnet rod assemblies 10 arranged in two rows, wherein the retractable magnet rod assemblies 10 are spaced apart in transversal direction and longitudinal direction the flow direction in relation to the other retractable magnet rod assemblies 10. In this way, the mentioned retractable magnet rod assemblies 10 form a magnetic grid with an extension both in the horizontal and vertical plane. As can be seen from the magnetic field lines in the figures the retractable magnet rod assemblies 10 create magnetic fields therebetween.

The disclosed device 100 is easily scalable both vertically and transversally, which can be adapted and arranged in a material flow line where material flows where it is desired to remove unwanted magnetic metal material from the flow of material.

The device 100 provides a solution that is flexible in relation to the geometry of the installation area in both height and width.

By that the device 100 preferably includes at least two rows of retractable magnet rod assemblies 10, as seen in FIG. 4, where there are three magnet rod assemblies 10 in the first row and four retractable magnet rod assemblies 10 in the second row, is achieved a solution where the operation can be continued, i.e. the flow of material do not need to be stopped during cleaning/removing of magnetic material from the retractable magnet rod assemblies 10 as a retractable magnet rod assembly of the first row can be cleaned while the second row continues to capture unwanted magnetic metal material and vise versa.

It is further achieved a device 100 where the retractable magnet rod assemblies 10 can be independently cleaned in an automated manner, as shown in FIGS. 6A-6E, by pivoting the retractable magnet rod assemblies 10 about the common pivoting axis structures 50.

Figure 6A:
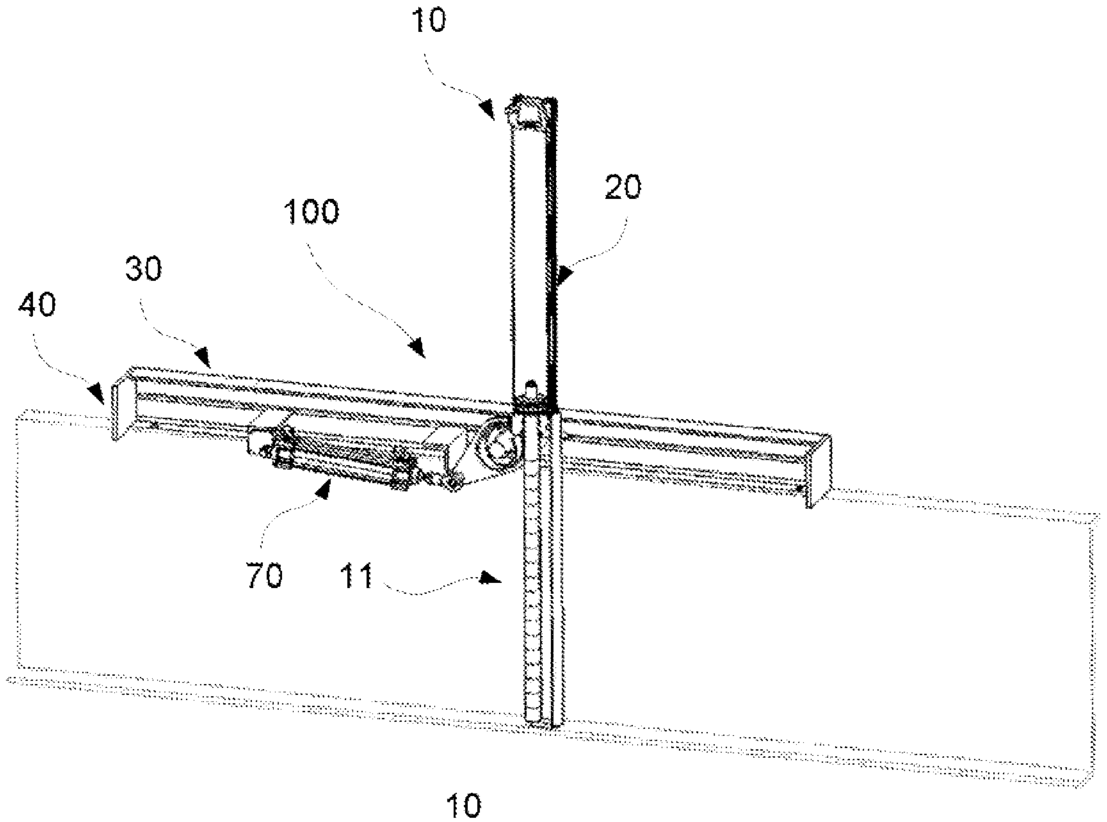
FIGS. 6A-6E are principle drawings of a cleaning cycle for a retractable magnet rod assembly as disclosed herein.
Figure 6B:
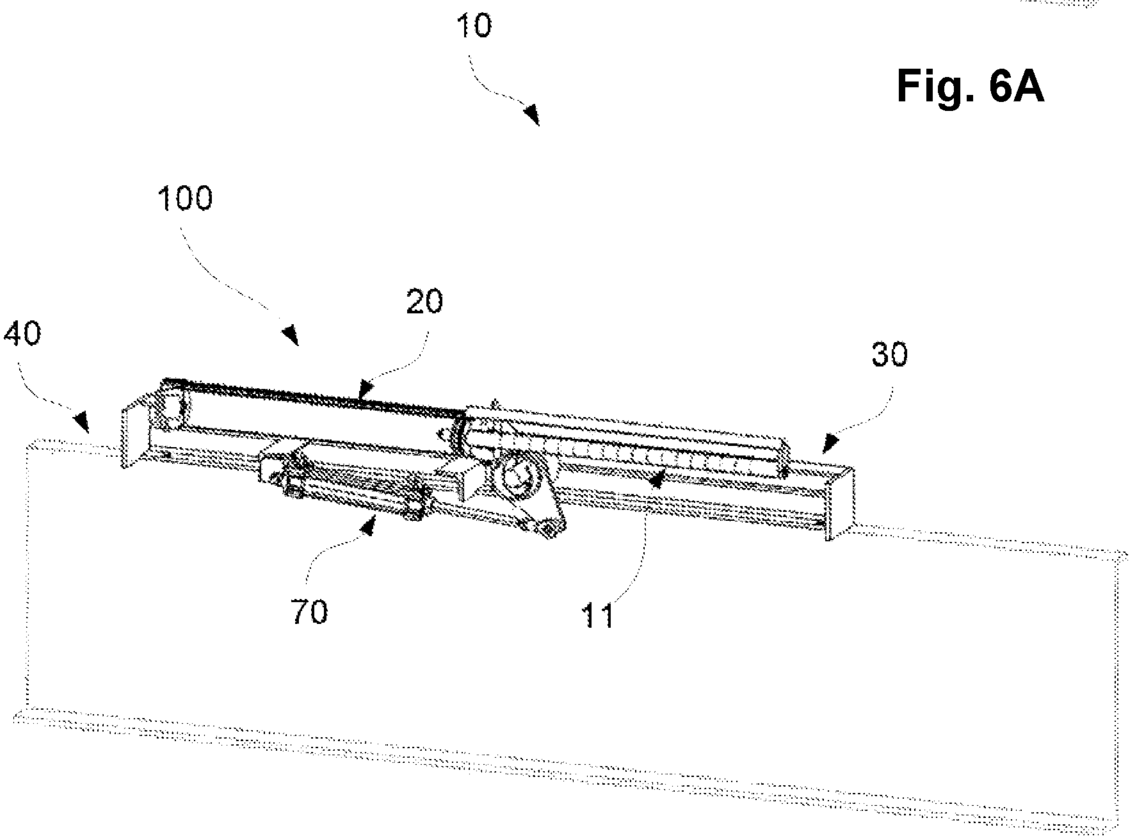

In FIG. 6A is shown a position where the retractable magnet rod 10 is in an extended position in the magnet flow capturing magnetic material. In FIG. 6B is shown a position where the retractable magnet rod assembly 10 is in a pivoted position for cleaning, i.e. pivoted to a position mainly in the horizontal plane above the common pivoting axis structure 50, and wherein the lower end of the housing 21 and the metal scraper 23 is positioned above the mentioned openings 51 in the pivoting axis structure 50. In the mentioned horizontal position, non-contaminated liquids will drain from the extracted magnet rods 11 before cleaning of the magnet rods 11 is performed.

Figure 6C:
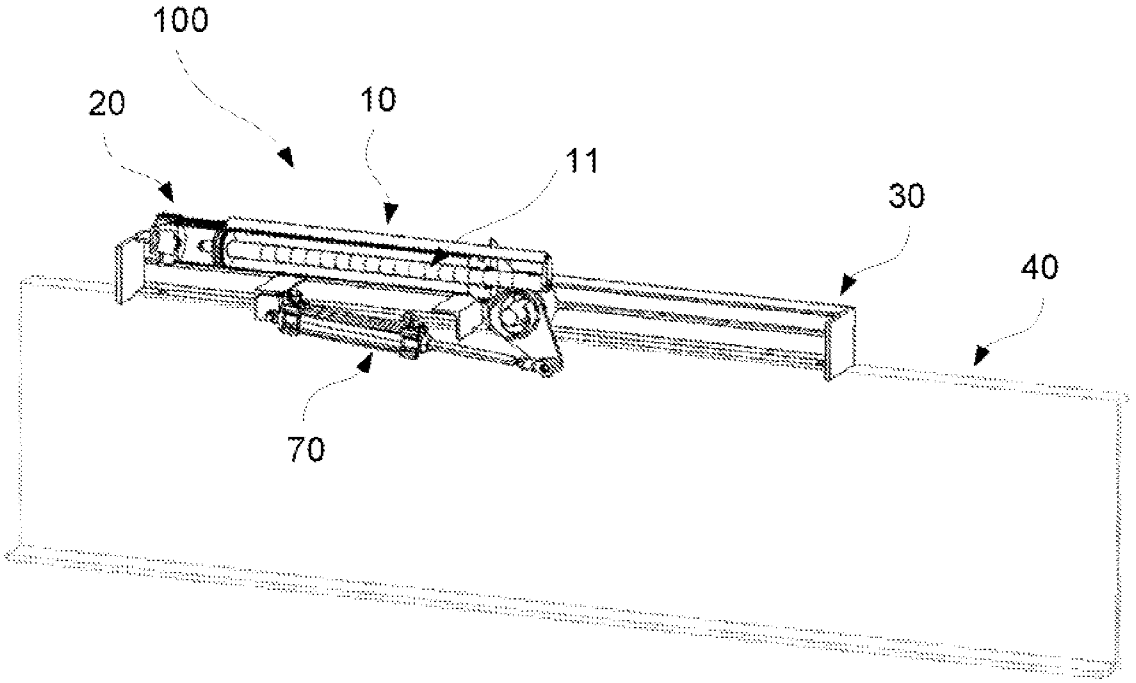

In FIG. 6C is shown a position where the magnet rod 11 is retracted into the housing by the linear actuator 20, which retracting movement results in that the captured unwanted magnetic material is removed from the retractable magnet rod assembly 10 by the metal scraper 23 and falls into the pivoting axis structure 50 and wherein the device 52 for extraction can transport the collected material to the outlet for further handling.

Figure 6D:
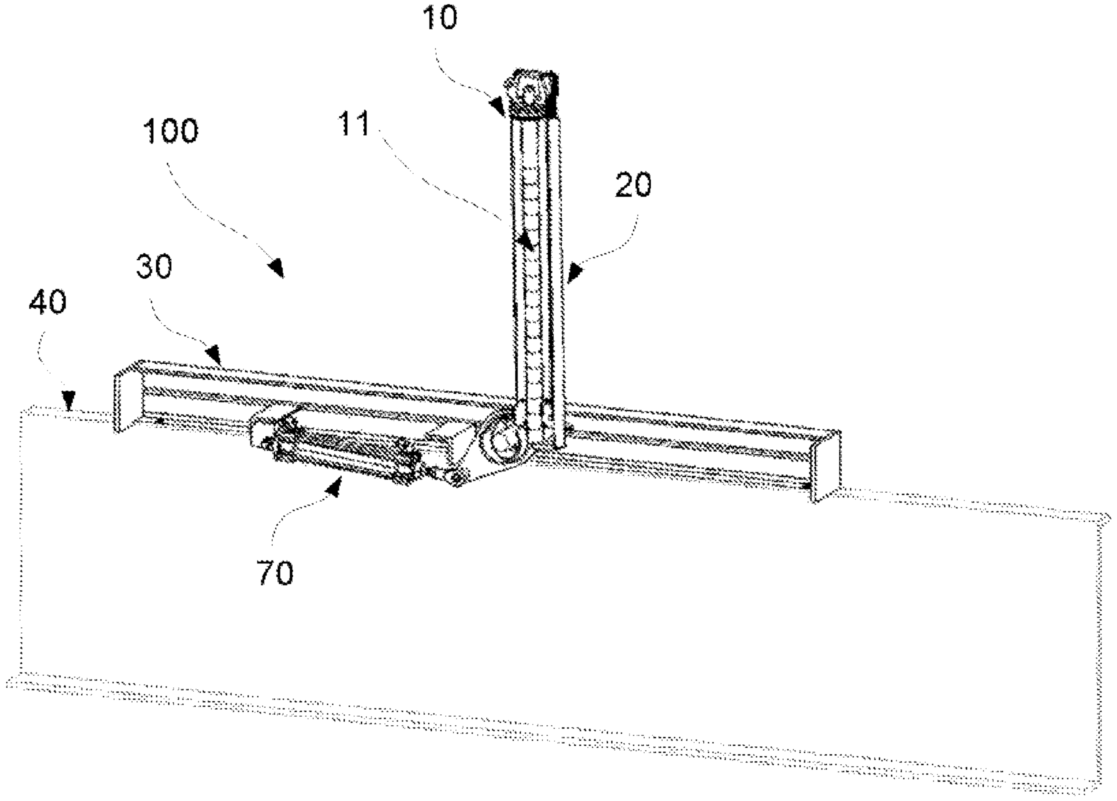
Figure 6E:
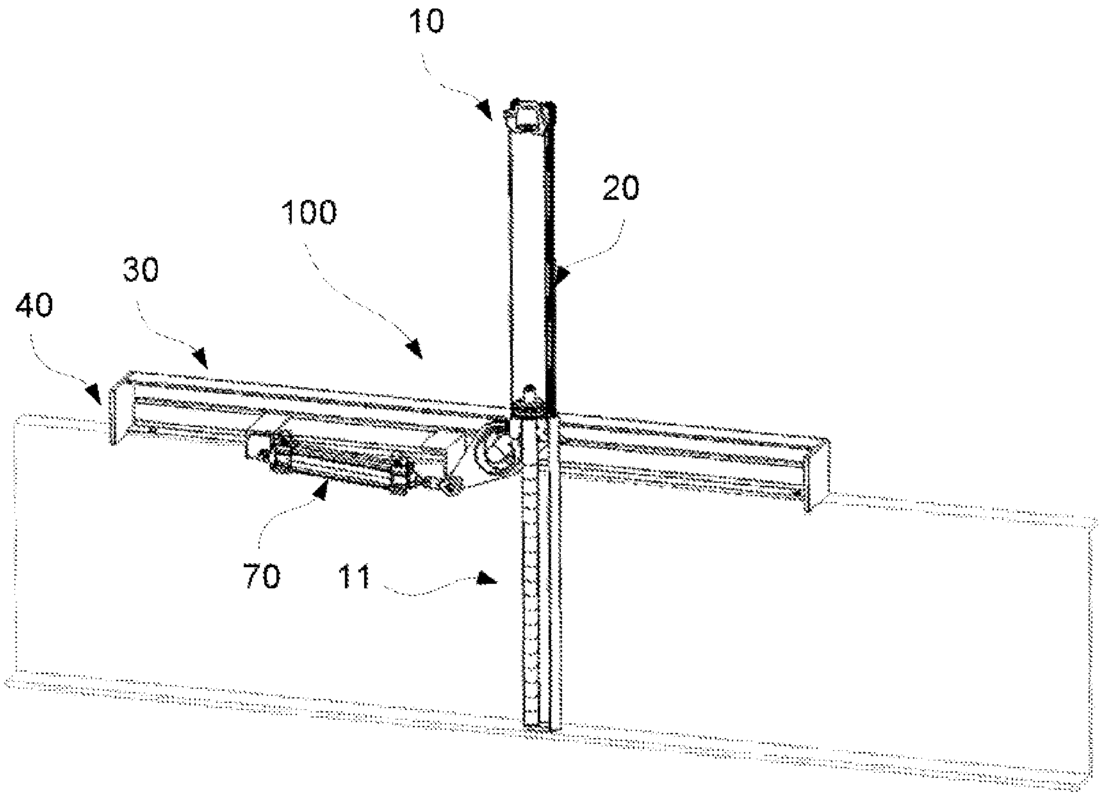

In FIG. 6D is shown a position where the retractable magnet assembly 10 is pivoted to vertical position again and FIG. 6E shows a position where the magnet rod 11 is in extended position and positioned in the material flow for collecting material again.

The same procedure can then be repeated for another of the retractable magnet assemblies 10. If not critical more than one of the retractable magnet assemblies may perform the cleaning process at the same time.

Provided herein is a device 100 where no manual handling of the magnet rod assemblies 10 for cleaning is required satisfying the requirements of HES (Health, Environment and Safety).

The inventive embodiments are especially suitable for capturing and removing metal cuttings from an oil well drilling fluid stream onshore or offshore, magnetic metal material in a flow of raw material, process lines in food industry (animal, fish and human food) and also recovery or recycling plants, etc.

The disclosed embodiments are easy to install and can be retrofitted to existing launder/chute structures.

The disclosed embodiments are adaptive and scalable for various installations.

The outlet is arranged to or provided with a weight, enabling weighing and logging of removed material (waste).

The disclosed device is also provided with the self-adjusting cleaning cycle time based on weight of removed material. By a control unit provided with means and/or software for controlling the operation of each retractable magnet rod assembly 10, self-adjusting of cleaning cycle time based on weight of removed material is achieved.

The disclosed embodiments will have considerable shorter time for cleaning than comparable prior art solutions as there is no requirement for removing the magnet rod assemblies from the device for cleaning.

The device may further be provided with alarm features based on expected material weight. In this manner an operator can be alerted if the material weight is unexpected high, indicating failure of equipment.

The device is further adaptive to e.g. rig control system via communication means.

The device is further fully retractable from the flowline when not in use.

The invention claimed is:

1. A device (100) for automatic capturing and removing magnetic material from a flow of material, comprising a plurality of retractable magnet rod assemblies (10) for capturing magnetic material in a flow of material passing the retractable magnet rod assemblies (10), each retractable magnet rod assembly (10) including a magnet rod (11) comprising at least two magnet segments (11*a*) encapsulated in a non-magnetic material, wherein the retractable magnet rod assemblies (10) are independently pivotable about a common pivoting axis structure (50), and the magnet rod (11) is arranged to an actuator mechanism (22) of a linear actuator assembly (20) retracting and extending the magnet rod (11) into and out from a housing (21) of the actuator assembly (20), wherein the linear actuator assembly (20) comprises at least one wiper (23) at one end where the magnet rod (11) protrudes from the housing (21), the at least one wiper (23) configured to remove magnetic material as the magnet rod (11) is retracted into the housing (21).

2. The device (100) according to claim 1, wherein the retractable magnet rod assembly (10) is pivotable about the common pivoting axis structure (50) between a vertical and horizontal position via a linear or rotating actuator (70).

3. The device (100) according to claim 1, wherein the common pivoting axis structure (50) is hollow and provided with openings (51) configured for collecting removed magnetic material from the retractable magnet rod assemblies (10).

4. The device (100) according to claim 2, wherein the common pivoting axis structure (50) is hollow and provided with openings (51) configured for collecting removed magnetic material from the retractable magnet rod assemblies (10).

5. The device (100) according to claim 3, wherein the common pivoting axis structure (50) comprises a rotating screw arrangement or conveyor arrangement (52) configured for extracting removed material from the common pivoting axis structure (50).

6. The device (100) according to claim 1, wherein the retractable magnet rod assemblies (10) are arranged to the common pivoting axis structure (50) via mounting brackets (60) configured to arrange the magnet rods (11) in a predetermined pattern for obtaining optimal placement of the retractable magnet rod assemblies (10) for a defined magnetic density flux grid in cross-section of the device (100).

7. The device (100) according to claim 3, wherein the retractable magnet rod assemblies (10) are arranged to the common pivoting axis structure (50) via mounting brackets (60) configured to arrange the magnet rods (11) in a predetermined pattern for obtaining optimal placement of the retractable magnet rod assemblies (10) for a defined magnetic density flux grid in cross-section of the device (100).

8. The device (100) according to claim 1, comprising at least two rows of retractable the magnet rod assemblies (10) for enabling continuous capturing of magnetic material, wherein the at least two rows of retractable magnet rod assemblies (10) are arranged displaced from each other in a longitudinal direction and a transversal direction in relation to one another and in relation to a flow direction of the material, thereby creating a cross web of magnetic field on both a horizontal section and a vertical section between retractable magnet rod assemblies (10) of the device (100).

9. The device (100) according to claim 3, comprising at least two rows of retractable the magnet rod assemblies (10) for enabling continuous capturing of magnetic material, wherein the at least two rows of retractable magnet rod assemblies (10) are arranged displaced from each other in a longitudinal direction and a transversal direction in relation to one another and in relation to a flow direction of the material, thereby creating a cross web of magnetic field on both a horizontal section and a vertical section between retractable magnet rod assemblies (10) of the device (100).

10. The device (100) according to claim 1, wherein the magnet rod (11) of the retractable magnet rod assemblies (10) is adjustable in a longitudinal direction to obtain full magnet rod (11) contact between the fluid and magnetic surface in full height of the cross-section at a structure (40) in which material is flowing at an installation site.

11. The device according to claim 1, wherein the magnet rods (11) include permanent magnets, controllable magnets or electromagnets.

* * * * *